(12) United States Patent
Grasser et al.

(10) Patent No.: US 7,630,085 B2
(45) Date of Patent: Dec. 8, 2009

(54) INTERFEROMETERS OF HIGH RESOLUTIONS

(75) Inventors: Regis Grasser, Mountain View, CA (US); Satyadev Patel, Sunnyvale, CA (US); Andrew Huibers, Palo Alto, CA (US)

(73) Assignee: Texas Instruments Incorporated, Dallas, TX (US)

( * ) Notice: Subject to any disclaimer, the term of this patent is extended or adjusted under 35 U.S.C. 154(b) by 566 days.

(21) Appl. No.: 11/110,557

(22) Filed: Apr. 19, 2005

(65) Prior Publication Data

US 2006/0232785 A1   Oct. 19, 2006

(51) Int. Cl.
*G01B 11/02* (2006.01)

(52) U.S. Cl. ..................................... 356/497

(58) Field of Classification Search ............... 356/496, 356/512, 485, 489, 492, 495, 511
See application file for complete search history.

(56) References Cited

U.S. PATENT DOCUMENTS

| | | | | |
|---|---|---|---|---|
| 4,468,122 A | * | 8/1984 | Puryaev | 356/513 |
| 4,639,139 A | | 1/1987 | Wyant et al. | |
| 4,776,698 A | | 10/1988 | Crosdale | |
| 4,794,550 A | | 12/1988 | Greivenkamp, Jr. | |
| H000637 H | * | 6/1989 | Baciak | 356/508 |
| 4,936,665 A | * | 6/1990 | Whitney | 359/565 |
| 4,948,253 A | * | 8/1990 | Biegen | 356/495 |
| 4,984,893 A | | 1/1991 | Lange | |
| 4,988,886 A | | 1/1991 | Palum et al. | |
| 5,069,548 A | | 12/1991 | Boehnlein | |
| 5,159,408 A | * | 10/1992 | Waldenmaier et al. | 356/485 |
| 5,390,023 A | * | 2/1995 | Biegen | 356/497 |
| 5,734,478 A | * | 3/1998 | Magome et al. | 356/401 |
| 5,771,095 A | | 6/1998 | Prokryl et al. | |
| 5,808,724 A | | 9/1998 | Ina et al. | |
| 6,088,474 A | | 7/2000 | Dudasko et al. | |
| 6,141,107 A | * | 10/2000 | Nishi et al. | 356/401 |
| 6,219,145 B1 | * | 4/2001 | Gutierrez et al. | 356/498 |
| 6,339,505 B1 | * | 1/2002 | Bates | 359/642 |
| 6,341,259 B1 | | 1/2002 | Gutierrez et al. | |
| 6,708,132 B1 | | 3/2004 | Gutierrez et al. | |

(Continued)

OTHER PUBLICATIONS

Henry Chu, et al., "DMD superstructure Characterizations", Jul.-Sep. 1998, pp. 75-86.

(Continued)

*Primary Examiner*—Gregory J Toatley, Jr.
*Assistant Examiner*—Scott M Richey
(74) *Attorney, Agent, or Firm*—Charles A. Brill; Wade James Brady, III; Frederick J. Telecky, Jr.

(57) ABSTRACT

The present invention provides a microstructure device comprising multiple substrates with the components of the device formed on the substrates. In order to maintain uniformity of the gap between the substrates, a plurality of pillars is provided and distributed in the gap so as to prevent decrease of the gap size. The increase of the gap size can be prevented by bonding the pillars to the components of the microstructure. Alternatively, the increase of the gap size can be prevented by maintaining the pressure inside the gap below the pressure under which the microstructure will be in operation. Electrical contact of the substrates on which the micromirrors and electrodes are formed can be made through many ways, such as electrical contact areas, electrical contact pads and electrical contact springs.

54 Claims, 5 Drawing Sheets

U.S. PATENT DOCUMENTS

| | | | |
|---|---|---|---|
| 6,721,094 B1* | 4/2004 | Sinclair et al. | 359/386 |
| 6,788,210 B1 | 9/2004 | Huang et al. | |
| 6,847,461 B1 | 1/2005 | Latypov et al. | |
| 6,922,483 B2 | 7/2005 | Doane | |
| 6,970,253 B2* | 11/2005 | Lindner et al. | 356/511 |
| 7,054,071 B2* | 5/2006 | Davidson | 359/656 |
| 7,106,454 B2* | 9/2006 | De Groot et al. | 356/511 |
| 7,139,081 B2* | 11/2006 | De Groot | 356/503 |
| 7,145,663 B2* | 12/2006 | Hill | 356/512 |
| 7,212,356 B2* | 5/2007 | Guenther et al. | 359/819 |
| 7,375,821 B2* | 5/2008 | Han et al. | 356/497 |
| 2001/0019415 A1 | 9/2001 | Prikryl et al. | |
| 2003/0048454 A1* | 3/2003 | Prinzhausen et al. | 356/497 |
| 2003/0137655 A1 | 7/2003 | Wegmann | |
| 2003/0218753 A1 | 11/2003 | Reuter | |
| 2003/0223084 A1 | 12/2003 | Mehri et al. | |
| 2004/0027576 A1* | 2/2004 | De Groot et al. | 356/498 |
| 2004/0042000 A1 | 3/2004 | Mehri et al. | |
| 2004/0109168 A1 | 6/2004 | Fukui | |
| 2004/0207386 A1 | 10/2004 | Durr | |
| 2005/0099622 A1* | 5/2005 | Caracci et al. | 356/300 |
| 2005/0134863 A1* | 6/2005 | De Lega et al. | 356/512 |
| 2006/0007557 A1* | 1/2006 | Davidson | 359/656 |
| 2006/0232784 A1* | 10/2006 | Grasser et al. | 356/512 |
| 2006/0245032 A1* | 11/2006 | Doan et al. | 359/291 |
| 2006/0256350 A1* | 11/2006 | Nolte et al. | 356/601 |
| 2008/0151253 A1* | 6/2008 | Korner et al. | 356/451 |

OTHER PUBLICATIONS

W.N. Sharpe, et al. "Tensile testing of MEMS materials-recent progress". Journal of Materials Science 38 (2003), pp. 4075-4079.

T.E. Buchheit, et al., "Micromechanical testing of MEMS materials", Journal of Materials Science 38 (2003), pp. 4081-4086.

S.M. Allameh, et al., "An introduction to mechanical- properties-related issues in MEMS structures", Journals of Materials Science 38 (2003), pp. 4115-4123.

S.M. Allameh, et al., Surface topography evolution and fatigue fracture of polysilicon, Journal of Materials Science 38 (2003), pp. 4145-4155.

Ken Gall, et al., "Thermomechanical response of bare and $Al_2O_3$—nanocoated Au/Si bilayer beams for micromechanical systems", J. Mater. Res., vol. 18, No. 7, Jul. 2003, pp. 1575-1587.

* cited by examiner

INTERFEROMETERS OF HIGH RESOLUTIONS

TECHNICAL FIELD OF THE INVENTION

The present invention is related generally to the art of microscopic systems, and, more particularly, to interferometers.

BACKGROUND OF THE INVENTION

Interferometers are optical instruments to generate interference fringes using two phase coherent light beams. From the interference fringes, other information, such as wavelengths of the light beams used in generating the interference fringes, distances or small displacements, and profiles of the sample surfaces can be extracted. The basic mechanism of interferometers is to produce a light beam, and split such light beam into two separate light beams using a beam splitter. One split light beam is directed to the sample surface in the measurement arm and reflected by the sample surface to generate a sample beam. The other split beam is directed to a mirror surface in the reference arm and reflected thereby to generate a reference beam. The sample beam and reference beam are recombined together in a detector, where the two beams constructively and destructively interfere, resulting in an interference fringe.

Michelson and Mirau interferometers are typical interferometers currently used for microscopic analyses in many aspects of scientific and industry fields. Michelson interferometers are often applied to microscopic objectives with low magnifications requirements, typically 5× or less. For observations requiring high magnifications, such as 5× or more, Mirau interferometers are often employed due to their high magnifications (e.g. 5×, 10×, and 20× or higher). However, current Mirau interferometers do not allow measurements of samples through transmissive substrates (e.g. a glass substrate) that are placed in front of the sample surface. This limitation arises from the fact that the additional light transmissive substrates introduce extra optical-path-differences to the system. Such extra optical-path-difference breaks the coherence of the sample and reference beams.

However, many observations using interferometers require both high resolution (e.g. in the order of micrometer) and capability of measuring the sample surfaces through light transmissive substrates. For example, micromirror array devices are a type of microelectromechanical devices. A typical micromirror array device comprises an array of micromirror devices, the dimension of each of which is around tens of microns. Each micromirror comprises a reflective deflectable mirror plate for reflecting the incident light. The mirror plates of the micromirror devices are covered by a light transmissive substrate for protection. To measure the profile of the mirror plate surfaces using an interferometer, the interferometer is required to have both a resolution in the order of microns or less and capability of performing the measurement through the light transmissive substrate.

SUMMARY OF THE INVENTION

In view of the foregoing, the interferometer of the present invention has a magnification of a wide range, for example, from 5× to 60× or even higher. Magnifications higher than 60× can also be obtained by simply using a commercially available objective lens with the magnification higher than 60×. The interferometer of the present invention also allows for measurements through a light transmissive substrate by providing a reference mirror whose position is dynamically adjustable, or by providing a sample holder whose position is dynamically adjustable in combination of a compensation lens, or any combinations thereof.

In an embodiment of the invention, the reference mirror whose position is dynamically adjustable is employed. The distance between the reference mirror and beam splitter of the interferometer can be adjusted to compensate the optical-length-difference for samples with different transmissive substrates and samples without light transmissive substrate. The adjustment of the sample holder can be achieved by a piezoelectric actuator (e.g. a lead-zirconium titanium) or by a micro-step motor.

In another embodiment of the invention, a movable sample holder is provided. The sample to be measured is attached to the movable sample holder. For measuring sampled with light transmissive substrates of different thickness, the optical-path from the beam splitter to the sample can be adjusted by adjusting the position of the sample holder. The adjustment of the sample holder can be achieved by a piezoelectric actuator (e.g. a lead-zirconium titanium) or by a micro-step motor.

Positions changes of the reference mirror or the sample holder will result in quality degradation of the interference fringe pattern or blurry images of the interference fringe. This problem can be solved by a compensation lens.

The objects of the invention are achieved in the features of the independent claims attached hereto. Preferred embodiments are characterized in the dependent claims.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

FIG. 9 illustrates a cross-sectional view of an exemplary micromirror array that can be measured with the interferometer of the present invention.

DETAILED DESCRIPTION OF THE EMBODIMENTS

Figure 1:
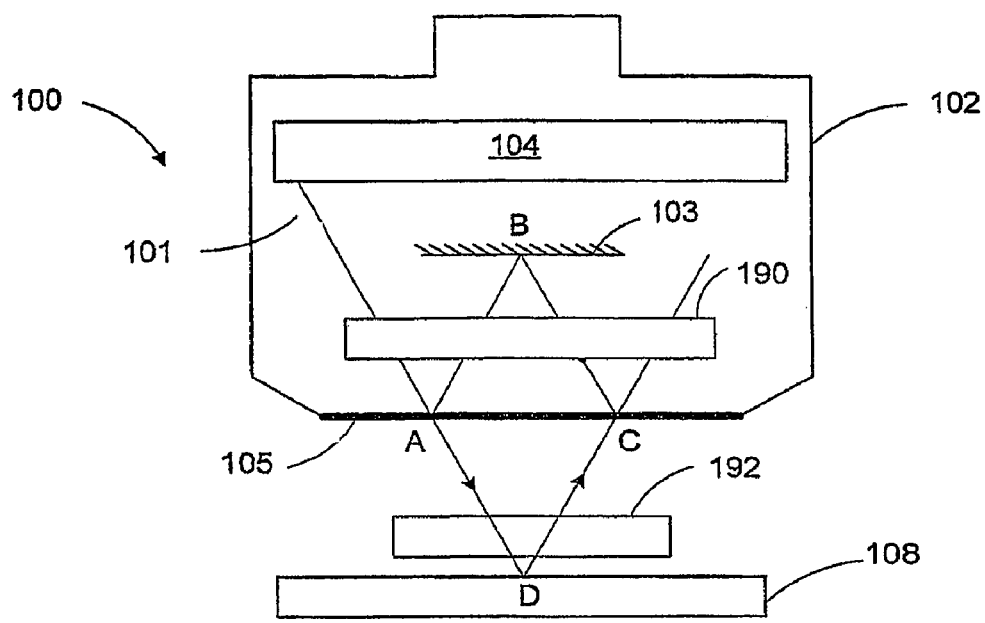
FIG. 1 schematically illustrates an interferometer according to an embodiment of the invention.

Turning to the drawings, FIG. 1 illustrates an interferometer according to an embodiment of the invention. Referring to FIG. 1, interferometer 100 has object housing 102, in which microscope objective 104, reference mirror 103, and beam splitter 105 are disposed. Light beam 101 from the light source (not shown in the figure) and objective 104 is split into two beams at point A of beam splitter 105. One of the split beams passes through the beam splitter and continuously propagates to point D at the surface of sample 108. This split beam is reflected by the surface (referred to as the sample beam) of the sample at point D and bounced back towards the detector. The sample beam passes through beam splitter 105 at point C.

The other branch of the split beam at point A is reflected by beam splitter 105 and re-impinges beam splitter at point C after the reflection of reference mirror 103 at point B. At point C of the beam splitter, the reference beam is combined with the sample beam. The two beams then constructively and destructively interfere with each other. The combined beams are collected by a detector (e.g. a CCD camera, which is not shown in the figure) for display and analyses.

In accordance with an embodiment of the invention, objective lens 104 has a magnification of 5×, 10×, 20×, 55×, and 60× times or higher, such that the system has a resolution of 500 microns or higher, such as 100 microns or higher, 50 microns or higher, 20 microns or higher, and 1 micron or higher. Reference mirror B 103 can be movable in relation to beam splitter 105 such that the optical path AB+BC can be dynamically adjusted. The movement of reference mirror B 103 can be accomplished by attaching a micro-actuator to the reference mirror B. A micro-actuator is an actuator whose actuation movement is in the order of microns. Exemplary micro-actuators are piezoelectric actuators (e.g. a lead-zirconium titanium) and micro-step motors. The micro-actuator used for driving the reference mirror B is preferably programmable—that is can be controlled by users. Specifically, a programmable module can be embedded into the micro-actuator for controlling the operations of the micro-actuators. Such programmable module comprises an interface from which operation parameters relevant to the operations (e.g. the speeds and step width (in microns)) can be delivered to the micro-actuators. Alternatively, the programmable module can be in a form a sequence of computer-executable instructions (e.g. computer readable program codes) stored in a computer-readable medium (e.g. a volatile or non-volatile storage medium) of a computing device, such as computer system.

The computing device can be of variety of configurations. In a simplified configuration, the computing device may comprise a central processing unit and a storage medium. The storage medium can be removable and non-removable media implemented in any method or technology for storage of information such as computer readable instructions, data structures, program modules or other data. The memory, the removable storage and the non-removable storage are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the device. Any such computer storage media may be part of, or used in conjunction with, the device.

Additionally, the computing device may also have other features and/or functionality. For example, the computing device can also include additional removable and/or non-removable storage including, but not limited to, magnetic or optical disks or tape, as well as writable electrical storage media.

The computing device may also contain one or more communications connections that allow the device to communicate with other devices. The communications connections carry information in a communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

Referring again to FIG. 1, reference mirror B can be configured movable relative to beam splitter 105 so as to maintain phase-coherency of the reference beam (with the optical path of AB and BC) from the reference mirror B and the sample beam (with the optical path of AD and DC) from the sample surface in measurement. However, when the reference mirror B is moved relative to the beam splitter, the image focal plane on the photodetector can be moved away from the display screen of the photodetector, resulting in blurred image. This can be corrected by compensation lens 190 disposed between the reference mirror B and beam splitter. Alternatively, compensation leans 192 can be disposed between the beam splitter and the sample surface being measured. In another embodiment of the invention, both of compensation lens 190 and 192 can be provided, but not required.

In yet another embodiment of the invention, the sample is attached to a sample holder having a micro-actuator such that the sample surface can be moved relative to the beam splitter so as to dynamically adjust the optical path of AD and DC. The blurry image resulted from the moved sample surface can be corrected by the compensation lens 192 that is disposed between the beam splitter and the sample surface.

The compensation lens 190 and 192 as discussed above can be of any suitable configurations, examples of which are lenses 136 and 138 as respectively illustrated in FIGS. 5 and 6, and which will be discussed in detail afterwards.

Figure 2:
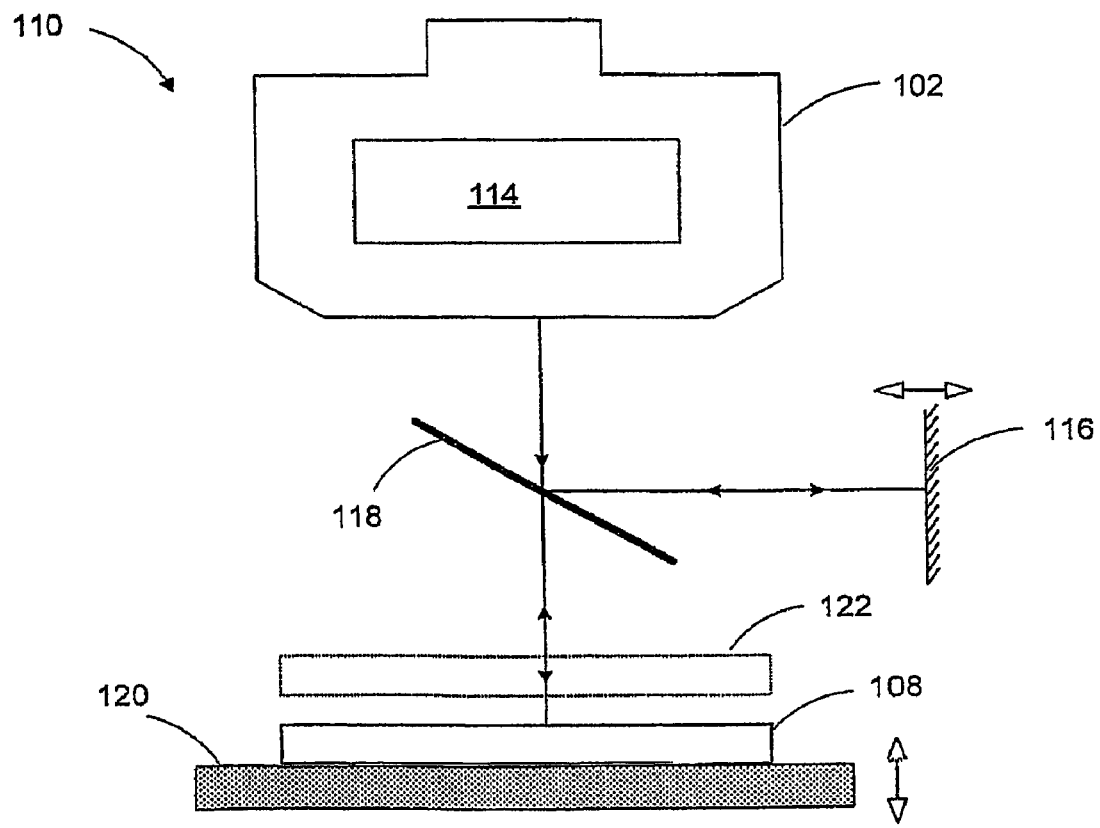
FIG. 2 schematically illustrates another interferometer of the present invention.

FIG. 2 schematically illustrates another interferometer in accordance with another embodiment of the invention. Interferometer 110 comprises objective lens house 102 that comprises objective lens 114, beam splitter 118, reference mirror 116, sample holder 120 whose position is dynamically adjustable, a light source (not shown in the figure), and a photodetector not shown in the figure). Sample 108 having a surface to be measured is attached to the sample holder. Light transmissive substrate 122 may be placed between the sample surface to be measured and the beam splitter.

The objective lens can be standard commercially available objective lens with any suitable magnifications, such as 5×, 10×, 20×, 55×, and 60× or even higher depending upon the desired resolution of the sample surface. Beam splitter 118 can also be a standard commercially available beam splitter that is capable of splitting the illumination light beam into two halves. The light source can be any suitable light source, such as white light bulbs, laser, arc lamps, and any mono-colored light sources. Because laser is highly phase-coherent, the interference fringe generated from the laser light may have far more details than necessary, which in turn diminishes the interference fringes being interested. According to the invention, a white light bulb of cost-effective can be used as the light source. In this instance, the difference of the distance between the reflective surface of the reference mirror and the beam splitter the distance between the sample surface to be measured and the beam splitter is 10 microns or less, such as 5 microns or less, or 3 microns or less, so as to maintain the phase-coherent between the reference beam reflected from the reference mirror and the sample beam reflected from the sample surface to be measured.

The sample holder is movable in the direction towards the beam splitter such that the distance between the sample surface to be measured and the beam splitter can be adjusted dynamically during measurement. Such movement of the sample holder can be achieved in many ways, for example, by a piezoelectric actuator (e.g. a lead-zirconium titanium) or by a micro-step motor.

The sample to be measured can be any sample of interest. In particular, the sample can be a microelectromechanical device, such as micromirror array devices, whose functional members under observation are in the size of microns.

In a measurement through light transmissive substrate 122, the illumination light illuminates both of the sample surface being measured and the reflective surface of the reference mirror after the beam splitter. Because of the light transmissive substrate 122 and the difference of the distance between the reference mirror and the beam splitter and the distance between the sample surface and the beam splitter, the reference beam reflected from the reference mirror and the sample beam reflected from the sample surface may not be phase coherent. The interference fringe may not be generated. To obtain the phase coherency of the reference beam and sample beam, the reference mirror can be moved so as to adjust the distance between the reflective surface of the reference mirror and the beam splitter. Such movement of the sample holder can be achieved in many ways, for example, by a piezoelectric actuator (e.g. a lead-zirconium titanium) or by a micro-step motor. When the optical-path-difference introduced by the light transmissive substrate 122 is compensated by the adjustment of the distance between the reflecting surface of the e reference mirror and the beam splitter, the reference beam and the sample beam regain the phase-coherency, and the interference fringe is produced, and collected by the photodetector for analyses.

Because the reference mirror is dynamically movable during the measurement, interference fringes can be obtained for light transmissive substrate 122 with different thicknesses. This is of particularly importance when the light transmissive substrate is a member of the sample being measured.

Figure 3:
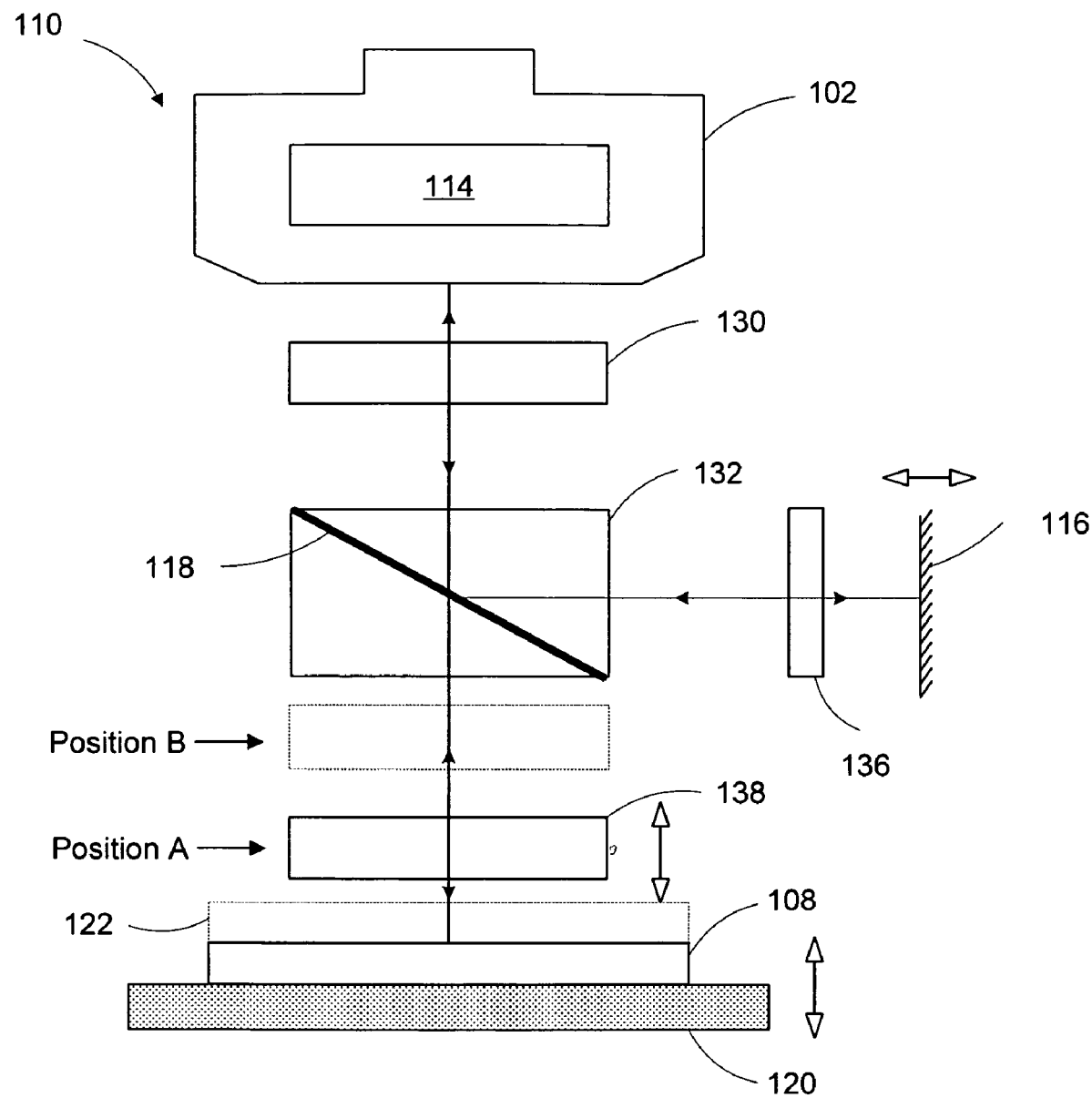
FIG. 3 schematically illustrates an interferometer comprising a compensation lens according to an embodiment of the invention.

In practice, beam splitter 118 is often carried in a beam splitter house for protection and simplification of installation. The beam splitter house generally comprises reflective interior surfaces for preventing diminishing of the light inside the house. These reflective interior surfaces, however, may result in aberration to the interference fringe. For this reason, compensation lens 130 is provided as shown in FIG. 3. Moreover, the reflecting surfaces, as well as the light transmissive substrate 122 may also introduce aberrations to the interference fringe, these aberrations can be corrected by compensation lens 138 in FIG. 3.

Figure 4:
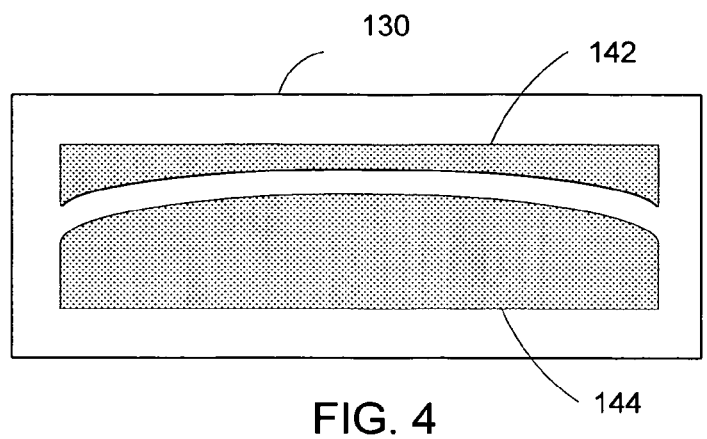
FIG. 4, FIG. 5, FIG. 6, FIG. 7, FIG. 8 and FIG. 9 schematically illustrate exemplary compensation lenses applicable in the interferometer in FIG. 3.

Referring to FIG. 3, compensation lens 130 is disposed between objective house 122 and beam house 132 in which beam splitter 118 is disposed for correcting the aberration introduced by the interior reflecting surfaces of beam splitter house 132. Compensation lens 130 can be any suitable lens. An exemplary such compensation lens assembly is schematically illustrated in FIG. 4. Referring to FIG. 4, compensation lens assembly 130 comprises lens concave lens 142 and convex lens 144. Concave lens 142 can be a Plano concave lens of silica with a center thickness from 1500 to 2500, preferably around 2000 microns. The diameter of the concave surface can be of any vales, preferably 10,000 microns or larger, such as 15,000 microns or larger. The radius of the concave surface is preferably from 40,000 to 60,000 microns, more preferably around 50,000 microns.

Convex lens 144 can be a Plano convex of BK7. BK7 is a borosilicate crown optical glass with high homogeneity, low bubble, and inclusion content. The typical transmission range is from 330 nm to 2100 nm. The thermo-expansion coefficient is around $7.5 \times 10^{-6}$/K, and the density is around 2.51 g/cm$^3$. Convex lens 144 preferably has a center thickness of from 1,500 to 2,500 microns, more preferably around 2,000 microns. The Diameter of convex lens 144 can be of any suitable value, and is preferably 10,000 microns or larger, such as around 12,000 microns. The radius of the convex surface is preferably from 20,000 to 30,000 microns, preferably around 26,000 microns.

Referring back to FIG. 3, compensating lens 138 is disposed between the beam splitter house 132 and the sample surface being measured for compensating the aberration introduced by the sample and the light transmissive substrate (e.g. light transmissive substrate 122) between the sample surface and the beam splitter. Compensation lens 138 can be any suitable lens, an example of which is illustrated in FIG. 5.

Figure 5:
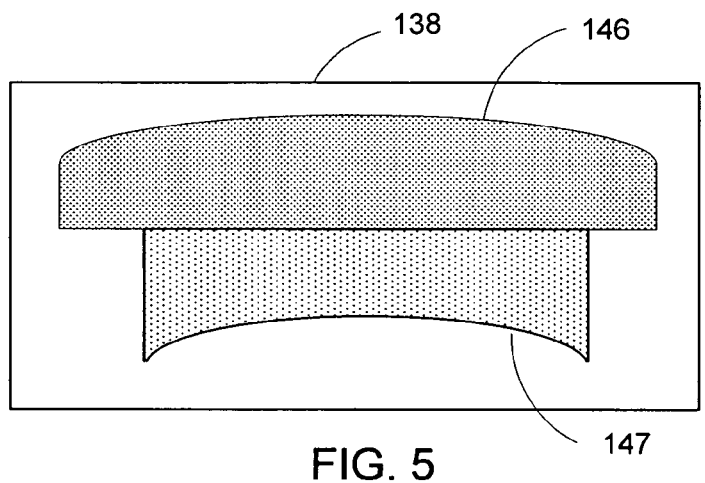
Figure 6:
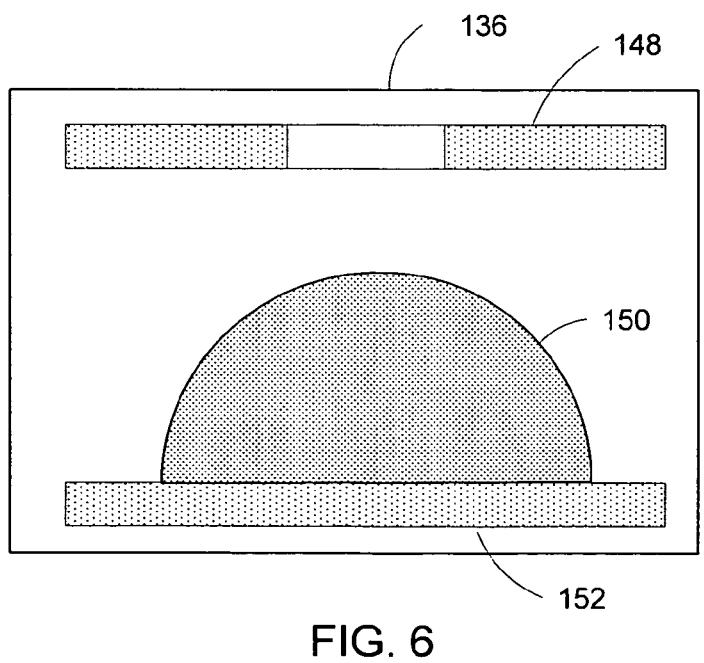

Referring to FIG. 5, compensating lens 138 comprises convex lens 146 and concave lens 147. Convex lens 146 can be a Plano convex of BK7, and preferably has a center thickness of from 2,000 to 3,000 microns, more preferably around 2,500 microns. The Diameter of convex lens 146 can be of any suitable value, and is preferably 6,000 microns or larger, such as around 9,000 microns. The radius of the convex surface is preferably from 9,000 to 11,000 microns, preferably around 10,000 microns.

Concave lens 147 can be a Plano concave lens of silica with a center thickness from 1500 to 2500, preferably around 2000 microns. The diameter of the concave lens can be of any vales, preferably 6,000 microns or larger, such as 7,300 microns or larger. The radius of the concave surface is preferably from 6,000 to 8,000 microns, more preferably around 7,000 microns.

As an alternative feature, another compensating lens 136 can be disposed on the propagation path of the illumination beam in the reference arm, such as disposed between the beam splitter house 132 and reference mirror 116 for compensating aberration introduced by the reference mirror, as shown in FIG. 3. An exemplary compensation lens 136 is schematically illustrated in FIG. 6. Referring to FIG. 6, compensation lens assembly 136 comprises window ring 148, hemispherical lens 150, and mirror 152.

Window ring 148 is a circular plate with a window opening around the origin through which the illumination beam passes. The window ring can be a fused silica with a thickness of from 700 to 1250 microns, preferably around 1100 microns. The diameter of the window ring (the diameter of the interior edge of the ring) can be of any value, preferably 300 microns or larger, such as around 6000 microns. The parallelism of the opposite major surfaces of the window ring is preferably 3.5 arc or less.

Hemispherical lens 150 can be of BK7, and preferably has a radius of from 4,500 to 5,500 microns, more preferably around 5,000 microns.

Mirror 152 can be any broadband dielectric plate. The thickness of the mirror is preferably from 1,000 to 10,000 microns, more preferably from 2,800 to 3,550 microns. The diameter of the mirror plate (in circular shape) can be of any suitable values, more preferable 5,000 or larger. The flatness of the reflective surface of the mirror is preferably $\lambda/10$ or less, wherein $\lambda$ is the wavelength of the illumination light beam.

Referring back to FIG. 3, with the compensation lenses 130, 138, and 136, aberrations introduced by the beam splitter house, the light transmissive substrate, the sample, and the reference mirror can be corrected so as to obtain a clear and precise interference fringe. In a measurement, other then moving the reference mirror (e.g. reference mirror 116), the sample can be moved in relation to the beam splitter through the movement of the sample holder. Specifically, due to the thickness differences of different light transmissive substrates, the images of the sample surfaces under measurement may not always be clear, regardless of the interference fringes from these surfaces, because different thickness introduce different optical-path-differences to the interferences. For this reason, compensation lens 138 is made movable, for example, by attaching compensation lens 138 to a driving mechanism, such as a piezoelectric actuator (e.g. a lead-zirconium titanium) or by a micro-step motor. In a measurement when the image of the sample surface is not clear, compensation lens 138 can be moved in relation to the beam splitter house so as to locate the focus plane of the system in the display screen of the photodetector.

The phase-coherency between the reference beam reflected from the reference mirror and the sample beam from the sample surface (through the light transmissive substrate) can be guaranteed by adjusting the position of the sample surface in relation to the beam splitter through the movable sample holder.

In an exemplary measurement, the measurement procedure may comprise: illuminating a white light beam to the sample surface and reference mirror through the beam splitter. Obtaining an image of the sample surface in the photodetector. If the image of the sample surface is not clear, such as obscure or blurry, adjusting compensating lens 138 so as to increase the image quality of the sample surface, then observing the interference fringe. If no such interference fringe, adjust the sample surface through the sample holder so as to obtain the phase-coherency of the sample beam from the sample surface and the reference beam from the reference mirror. When the interference fringe is observed in the photodetector, the image of the sample surface, thus the interference fringe may not be clear because the focal plane is moved away from the display screen of the photodetector. In this instance, compensation lens 138 can be readjusted to obtain a clear and precise interference fringe in the photodetector.

However, when the light transmissive substrate (e.g. light transmissive substrate 122) is too thick, or multiple light transmissive substrates are placed between the beam splitter and the sample surface, adjusting compensation lens 138 designated for measuring samples with one light transmissive substrate may not be sufficient. Another compensation lens of 136 is desired, which will be discussed in the following with reference to FIG. 7 and FIG. 8.

Figure 7:
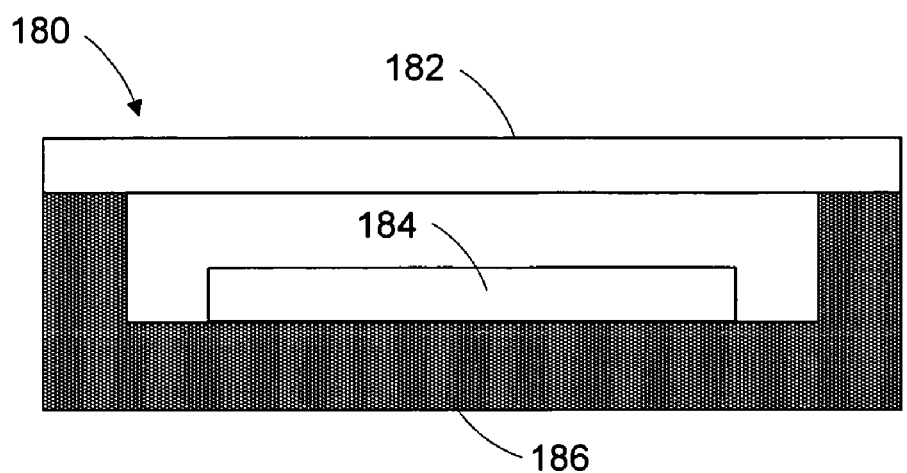

Referring to FIG. 7, sample 180 comprises device 184, package substrate 186, and package cover 182 that is transmissive to the illumination light. Device 184 can be any device that requires a resolution in the order of microns. An exemplary such device is a micromirror array device as illustrated in FIGS. 9 and 10.

Figure 9:
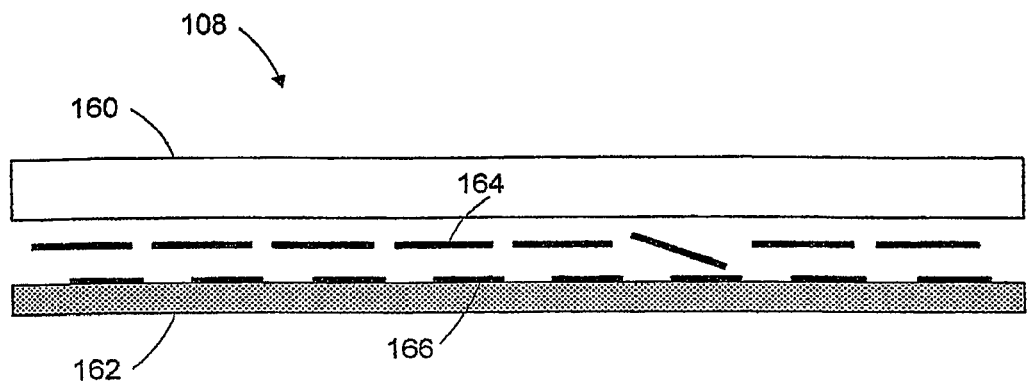

Referring to FIG. 9, a cross-sectional view of a micromirror array device is illustrated therein. For simplicity purposes, only eight micromirror devices are illustrated. In this example, an array of reflective deflectable mirror plates (e.g. mirror plate 164) are disposed between light transmissive substrate 160 and semiconductor substrate 162. An array of addressing electrodes (e.g. addressing electrode 166) is positioned proximate to and associated with the mirror plates for addressing and deflecting the mirror plates. The mirror plates can be formed on the light transmissive substrate (e.g. glass, quartz, and sapphire), in which instance, semiconductor substrate 162 and light transmissive substrate 160 are bonded together. Alternatively, the mirror plates can be formed on semiconductor substrate 162, in which instance, light transmissive substrate may not be necessary, but can be provided for protecting the mirror plates especially during the measurement. In another example, the mirror plates can be derived from a single crystal material, which will not be discussed in detail herein. A perspective view of an exemplary micromirror array device wherein the mirror plates are formed on light transmissive substrate 160 is illustrated in FIG. 10.

Figure 10:
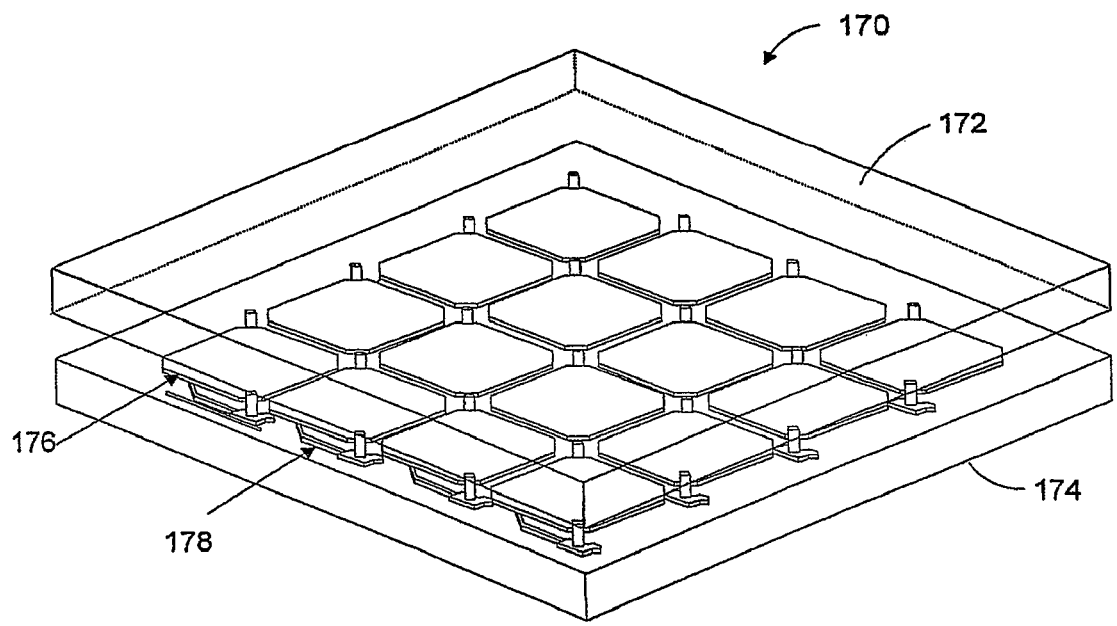
FIG. 10 illustrates a perspective view of a portion of an exemplary micromirror array device.

Referring to FIG. 10, device 170 has micromirror array 176 that is formed on light transmissive substrate 172, and addressing electrode array 178 that is formed on semiconductor substrate 174 for addressing and deflecting the reflective deflectable mirror plates of the micromirrors.

Each micromirror and mirror plate in FIG. 9 and FIG. 10 has a dimension in the order of microns. In a typical example, each mirror plate has a size around 10.17 microns, as set forth in U.S. patent application Ser. No. 10/627,155 filed Jul. 24, 2004, the subject matter being incorporated herein by reference.

Returning back to FIG. 7, when device 184 in the package is a device comprising a light transmissive substrate, such as the micromirror array device in FIG. 10, there will be two light transmissive substrates (i.e. package substrate 182 in FIG. 7 and light transmissive substrate 160 in FIG. 10) placed between the beam splitter 118 and the sample surface to be measured (i.e. the reflective surfaces of the mirror plates of micromirror array 176 in FIG. 10). In a measurement for such sample, adjusting compensation lens 138 may not be sufficient to obtain a clear interference fringe image in the photodetector due to the two light transmissive substrates (the package cover 182 in FIG. 7 and light transmissive substrate 160 in FIG. 9). In order to obtain a clear interference fringe for such devices, compensation lens 136 in FIG. 3 may be configured differently as compared with the exemplary compensation lens 136 as shown in FIG. 6.

Figure 8:
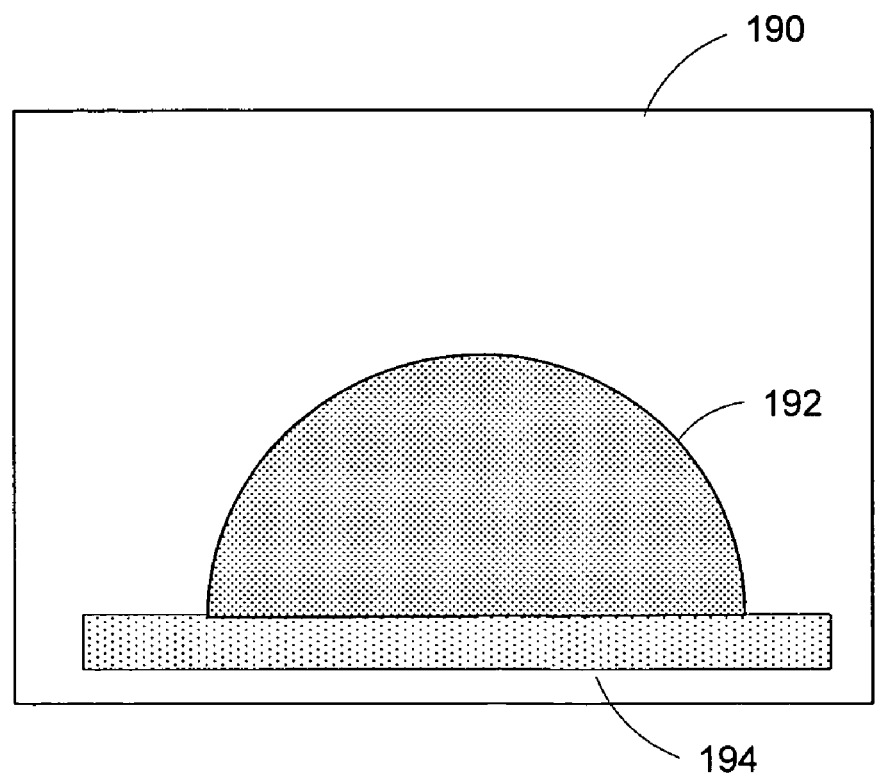

Referring to FIG. 8, another exemplary compensating lens 190 useable as compensation lens 136 in FIG. 3 is illustrated therein. As compared with the exemplary compensation lens 136 in FIG. 6, compensation lens 190 in FIG. 8 has no window ring (e.g. window ring 148 in FIG. 6). Hemispherical lens 192 and mirror 194 are provided, and may or may not be the same as the hemispherical lens 150 and mirror 152 in FIG. 6.

The method of the present invention as discussed above can also be implemented in programmable modules that are embedded in the measurement system as discussed above or in an independent console that is in connection to the measurement system so as to achieve automated data acquisition in measurements and subsequent data analyses. The independent console can be the computing device as discussed above with reference to FIG. 1. When implemented in an independent console, the programmable module can be in the form of a sequence of computer-executable instructions (e.g. computer executable program codes) stored in a computer-readable medium. Preferably, such programmable module comprises an interface from which operation parameters relevant to the operations (e.g. the speeds and step width (in microns)) can be delivered to the components of the measurement system and acquired data can be transferred out from the measurement system for analyses.

The measurement system may comprise other auxiliary features in addition to those discussed above for facilitating particular measurements. For example, in performing measurements for micromirror array devices as shown in FIGS. 9 and 10, additional signals sources can be provided and connected to the samples (i.e. the micromirror array device) in the measurement system. Specifically, power sources appropriate for deflecting the reflective deflectable mirror plates of the micromirrors in the micromirror array device can be connected to the micromirror array device such that, the mirror plates can be individually deflected during measurements. Alternatively, other sources, such as data signals (e.g. digital image signals) can also be coupled to the micromirror array device so as to enable dynamic measurements.

It will be appreciated by those skilled in the art that a new and useful interferometer, particularly useful for observing microscopic features of microns have been described herein. The interferometer of the present invention allows for measurements through light transmissive substrates. In view of many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention.

Specifically, photodetectors are provided in the above systems for detecting the interference fringes. Alternatively, the interference fringes generated in the measurement systems can be visualized or inspected without photodetectors, for example, by naked eyes or other types of image recording devices.

In addition to characterizing microstructures, the method and apparatus of the present invention can also be used to measure other devices or micro-systems. For example, the method and apparatus of the present invention can be employed to measure liquid-crystal devices, CCD devices, liquid-crystal on silicon devices, nano-structured devices or materials, micro-members of biological systems or devices, and nano-sized particles (e.g. optical reflective or non-reflective particles) in chemical industries.

Therefore, the invention as described herein contemplates all such embodiments as may come within the scope of the following claims and equivalents thereof. In the claims, only elements denoted by the words "means for" are intended to be interpreted as means plus function claims under 35 U.S.C. §112, the sixth paragraph.

We claim:

1. An interferometer system, comprising:
   a light source providing a light beam;
   an objective lens having a magnification of five times or higher;
   a beam splitter that splits the light beam into a reference beam and a sample beam;
   a reference mirror that reflects the reference beam back to the beam splitter;
   a sample holder having a supporting surface on which a sample can be disposed, the sample having a surface to be measured;
   a first compensation lens disposed between the beam splitter and the sample holder for compensating an aberration introduced by a first light transmissive substrate disposed over the sample surface to be measured;
   a second compensation lens for compensating an aberration introduced by an interior reflecting surface of a beam splitter house in which the beam splitter is disposed; and
   wherein the sample holder or the reference mirror is movable relative to the beam splitter so as to adjust an optical path of the system to form an interference fringe.

2. The system of claim 1, wherein the sample holder is movable relative to the beam splitter.

3. The system of claim 1, wherein the sample holder further comprises a micro-actuator.

4. The system of claim 3, wherein the micro-actuator comprises a piezo-actuator.

5. The system of claim 4, wherein the piezo-actuator comprises a lead zirconium titanium actuator.

6. The system of claim 3, wherein the micro-actuator comprises a micro-step motor.

7. The system of claim 1, further comprising:
   a third compensation lens disposed between the beam splitter and the reference mirror for compensating an aberration introduced by the reference mirror.

8. The system of claim 1, wherein the second compensation lens comprises:
   a concave lens; and
   a convex lens,
   wherein the convex lens is disposed closer to the beam splitter than the concave lens.

9. The system of claim 7, wherein the third compensation lens comprises:
   a mirror plate; and
   a hemisphere lens.

10. The system of claim 9, further comprising:
    a window having an area through which the reference beam passes.

11. The system of claim 1, further comprising:
    a photodetector for detecting and recording the interference fringe from the reflected reference beam from the reference mirror and a reflected sample beam from the sample.

12. The system of claim 1, wherein the light source comprises a white light bulb.

13. The system of claim 1, wherein the light beam comprises a monochromatic light beam.

14. The system of claim 1, wherein the light beam comprises a laser.

15. The system of claim 1, wherein the objective lens has a magnification of 20 times or more.

16. The system of claim 15, wherein the magnification is 45 times or more.

17. The system of claim 15, wherein the magnification is 60 times or more.

18. The system of claim 1, further comprising the sample having a reflective sample surface to be measured.

19. The system of claim 18, wherein the reflective sample surface comprises an array of reflective deflectable mirror plates.

20. The system of claim 19, wherein the mirror plates are formed on the first light transmissive substrate.

21. The system of claim 19, wherein the mirror plates are formed on a semiconductor substrate that is disposed beneath the first light transmissive substrate in relation to the light beam from the beam splitter.

22. The system of claim 20, wherein the first light transmissive substrate comprises a package cover that is bonded to a package substrate forming a gap therebetween, in which gap the mirror plates are disposed.

23. The system of claim 22, wherein the sample comprises a second light transmissive substrate disposed between the package cover and the mirror plates.

24. The system of claim 1, wherein the reference mirror is movable relative to the beam splitter.

25. The system of claim 1, wherein both the sample holder and the reference mirror are movable relative to the beam splitter.

26. The system of claim 24, wherein the reference mirror further comprises a micro-actuator.

27. The system of claim 26, wherein the micro-actuator comprises a piezo-actuator.

28. The system of claim 26, wherein the piezo-actuator comprises a PZT actuator.

29. The system of claim 26, wherein the micro-actuator comprises a micro-step motor.

30. The system of claim 18, wherein the sample comprises a CCD device.

31. The system of claim 18, wherein the sample comprises a LCD device.

32. The system of claim 18, wherein the sample comprises a LCOS device.

33. The system of claim 18, wherein the sample comprises a nano-structured device.

34. The system of claim 18, wherein the sample comprises a biological sample.

35. The system of claim 18, wherein the sample comprises a microstructure device.

36. The system of claim 35, wherein the sample comprises a microelectromechanical device.

37. The system of claim 1, wherein the interference fringe is detected by a photodetector.

38. The system of claim 1, wherein the first compensation lens further compensates for an aberration introduced by the sample.

39. An interferometer, comprising:
a light source providing a light beam;
an objective lens having a magnification of five times or higher;
a beam splitter that splits the light beam into a reference beam and a sample beam;
a reference mirror that reflects the reference beam back to the beam splitter;
a sample holder having a supporting surface on which a sample can be disposed, the sample having a surface to be measured;
a first compensation lens disposed between the beam splitter and the sample holder for compensating an aberration introduced by a first light transmissive substrate disposed over the sample surface to be measured,
a second compensation lens for compensating an aberration introduced by an interior reflecting surface of a beam splitter house in which the beam splitter is disposed;
wherein the first compensation lens comprises:
a concave lens; and
a convex lens disposed closer to the beam splitter than the concave lens; and
wherein the sample holder or the reference mirror is movable relative to the beam splitter so as to adjust an optical path of the system to form an interference fringe.

40. An interferometer system, comprising:
first means for providing a light beam;
second means for obtaining a resolution of 10 microns or higher for a reflective surface of a sample;
third means for generating an interference fringe of the reflective surface using the light beam through a light transmissive substrate of the sample, the third means comprising a first compensation lens, in a path of the light beam, for compensating an aberration introduced by the light transmissive substrate disposed over the sample, and comprising a beam splitter for splitting the light beam into a reference beam and a sample beam, wherein the reference beam is directed towards a reference mirror, the sample beam is directed towards the reflective surface of the sample, and the first compensation lens is disposed between the beam splitter and the sample; and
a second compensation lens for compensating an aberration introduced by an interior reflecting surface of a beam splitter house in which the beam splitter is disposed.

41. The system of claim 40, further comprising:
fourth means for supporting the sample and dynamically adjusting a distance between the beam splitter and the reflective surface so as to secure the interference fringe.

42. The system of claim 40, further comprising:
a third compensation lens disposed between the beam splitter and the reference mirror for compensating an aberration introduced by the reference mirror.

43. The system of claim 40, wherein the second compensation lens comprises:
a concave lens; and
a convex lens,
wherein the convex lens is disposed closer to the beam splitter than the concave lens.

44. The system of claim 40, wherein the first compensation lens comprises:
a concave lens; and
a convex lens, wherein the convex lens is disposed closer to the beam splitter than the concave lens.

45. The system of claim 44, wherein the third compensation lens comprises:
a mirror plate; and
a hemisphere lens.

46. The system of claim 45, further comprising:
a window having an area through which the reference beam passes.

47. The system of claim 43, further comprising:
a photodetector for detecting and recording the interference fringe from the reflected reference beam from the reference mirror and a reflected sample beam from the sample.

48. The system of claim 40, wherein the first means comprises a monochromatic light beam.

49. The system of claim 40, wherein the light beam comprises a laser.

50. The system of claim 40, wherein the second means comprises an objective lens having a magnification of 20 times or more.

51. The system of claim 50, wherein the magnification is 50 times or more.

52. The system of claim 1, further comprising:
a fourth compensation lens disposed between the beam splitter and the reference mirror for compensating an aberration introduced by a second light transmissive substrate disposed over the first light transmissive substrate.

53. The system of claim 52, wherein the fourth compensation lens further compensates for an aberration introduced by the reference mirror.

54. The system of claim 40, wherein the first compensation lens further compensates for an aberration introduced by the sample.

* * * * *

UNITED STATES PATENT AND TRADEMARK OFFICE
CERTIFICATE OF CORRECTION

PATENT NO. : 7,630,085 B2
APPLICATION NO. : 11/110557
DATED : December 8, 2009
INVENTOR(S) : Grasser et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 946 days.

Signed and Sealed this

Second Day of November, 2010

David J. Kappos
*Director of the United States Patent and Trademark Office*